(12) United States Patent
Utsugi et al.

(10) Patent No.: US 8,401,278 B2
(45) Date of Patent: Mar. 19, 2013

(54) IMAGE PROCESSING APPARATUS AND IMAGE PROCESSING METHOD

(75) Inventors: Kei Utsugi, Tokyo (JP); Takuma Shibahara, Machida (JP); Takafumi Koike, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 498 days.

(21) Appl. No.: 12/834,649

(22) Filed: Jul. 12, 2010

(65) Prior Publication Data

US 2011/0038529 A1 Feb. 17, 2011

(30) Foreign Application Priority Data

Aug. 12, 2009 (JP) ................................. 2009-186957

(51) Int. Cl.
*G06K 9/00* (2006.01)
(52) U.S. Cl. ........................................ 382/154; 345/419
(58) Field of Classification Search .................. None
See application file for complete search history.

(56) References Cited

U.S. PATENT DOCUMENTS

| | | | |
|---|---|---|---|
| 2003/0012408 A1* | 1/2003 | Bouguet et al. | 382/103 |
| 2010/0177955 A1* | 7/2010 | Simakov et al. | 382/154 |
| 2011/0128282 A1* | 6/2011 | Wang et al. | 345/419 |
| 2011/0211771 A1* | 9/2011 | Rubenstein et al. | 382/299 |
| 2012/0002107 A1* | 1/2012 | Damkat et al. | 348/445 |

OTHER PUBLICATIONS

Avidan, Shai, et al.; Seam Carving for Content-Aware Image Resizing; 2007; ACM Trans. Graph. 26, 3, Article No. 10; 9 pages.

* cited by examiner

*Primary Examiner* — Samir Ahmed
(74) *Attorney, Agent, or Firm* — Foley & Lardner LLP

(57) ABSTRACT

Image retargeting is appropriately performed on stereo pair images composed of at least two images such as in three-dimensional displays. A path of connected pixels in first image data is calculated based on pixel gradient energy. Each pixel in second image data corresponding to each pixel in connected pixels in the first image data is calculated as an initial search point, based on the stereo correspondence relationship between the first image data and the second image data. Pixels that minimize energy between pixels of the first image data and pixels of the second image data in the proximity of the initial search point is calculated as a path of connected pixels in the second image data. A path of optimal connected pixels in the first image data is calculated using the energy.

5 Claims, 15 Drawing Sheets

FIG. 1
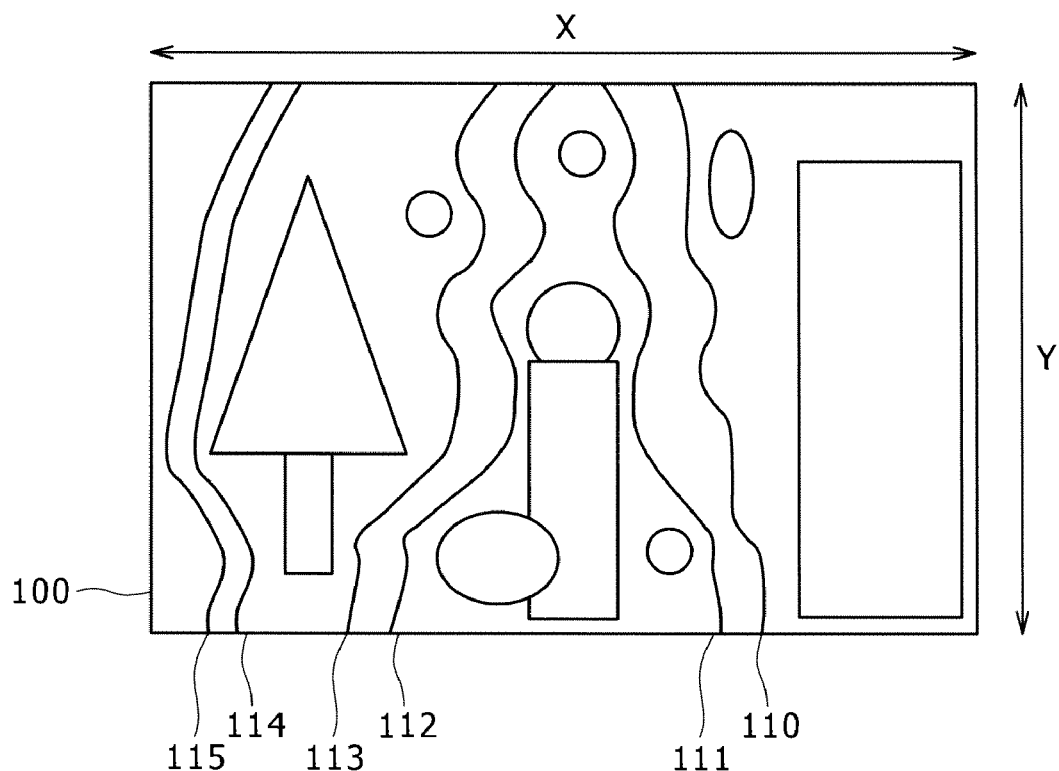
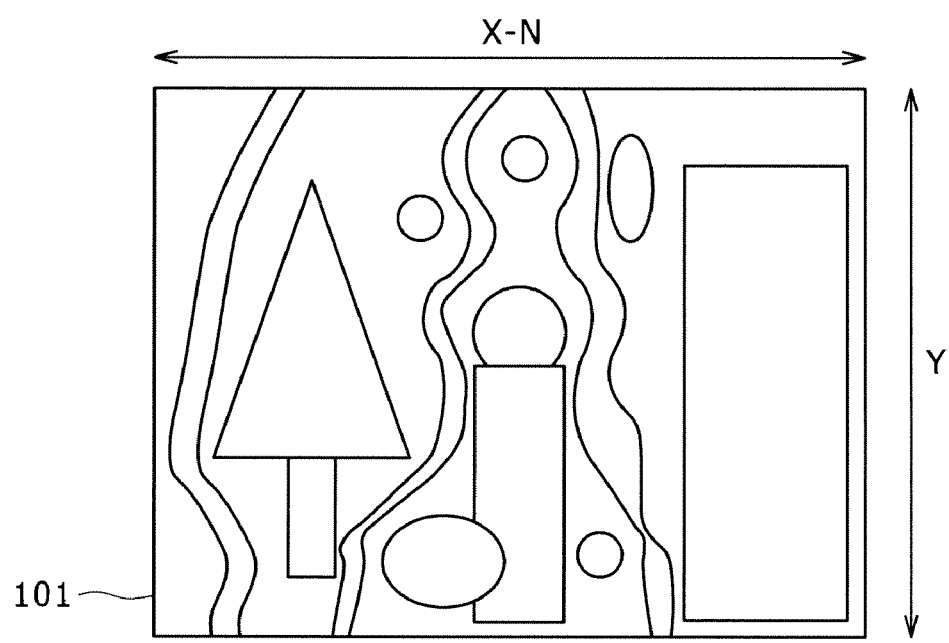

FIG. 6
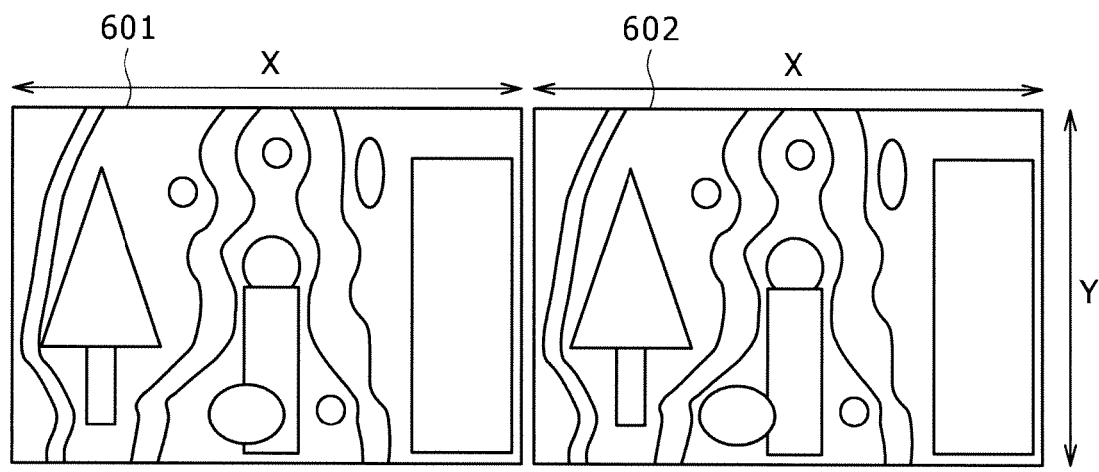
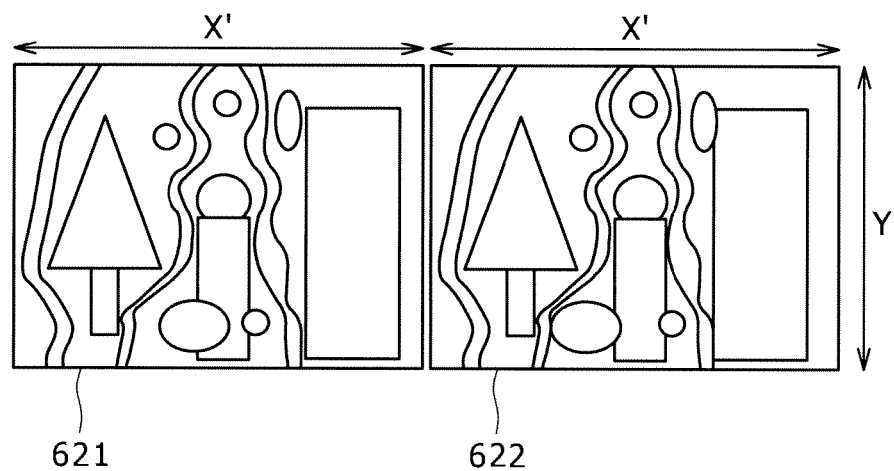

IMAGE PROCESSING APPARATUS AND IMAGE PROCESSING METHOD

INCORPORATION BY REFERENCE

This application claims the benefit of priority from Japanese Patent Application No. JP2009-186957 filed on Aug. 12, 2009, entitled "IMAGE PROCESSING APPARATUS AND IMAGE PROCESSING METHOD," the entire contents of which are incorporated herein by reference.

BACKGROUND

1. Field of the Invention

The present invention relates to an image processing apparatus and an image processing method, and in particular, relates to an image retargeting technique for stereo images.

2. Description of the Related Art

Recently, image display systems have become diversified in their sizes from small-size monitors such as PDA and mobile phones to large-screen displays, depending on applications. With this diversification, a simple reduction of an image without consideration of a resolution difference etc. may lose the impression of the image or necessary visual information; accordingly, the automatic/semiautomatic size change of content images has become a critical issue. The modification associated with the diversification of displays becomes a more critical issue in three-dimensional displays. In the modification of stereo images, since the parallax value between the positions of objects in the images indicates the depth, it becomes necessary to satisfy the consistency between the images, so that the constraint condition becomes much severer than that of the modification of two-dimensional images.

In view of such circumstances, studies are proceeding with context-aware image processing in consideration of important parts in the image in observation by human beings particularly as a technique for modifying two-dimensional image contents. This processing includes simple processing of cropping important parts and the automatic change of the composition with significant elements left. Among them, processing for changing the horizontal to vertical ratio while maintaining the shapes of important objects is called image retargeting. A technique called seam-carving is advocated as one of the image retargeting techniques (see AVIDAN, S., AND SHAMIR, A. 2007. Seam carving for content-aware image resizing. ACM Trans. Graph. 26, 3, Article No. 10).

SUMMARY

However, in "AVIDAN, S., AND SHAMIR, A. 2007. Seam carving for content-aware image resizing. ACM Trans. Graph. 26, 3, Article No. 10.", in the case where the processing is applied to stereo pair images composed of at least two images such as in three-dimensional displays, seam search processing is performed independently without adding information about the stereo correspondence relationship between the images. For this reason, there is a problem that the correspondence between the images is not established so that the object shape is not maintained, and if a seam is selected with only one image and the corresponding point is searched for in the other image, the seam that does not lead to the selection of an appropriate seam for the other image is preferentially selected.

The present invention is primarily characterized in that a rough stereo correspondence relationship between a pair of a main image and a sub image to be processed is calculated beforehand; in the selection of a connection component having the locally minimum energy for each pixel on a seam in the main image, it is determined whether a pixel corresponding to a pixel on the seam in the main image exists in the sub image as well; the color difference and position difference between the main image and the sub image is used and added as a correction factor of energy used in a seam search in the main image to determination processing in the optimal seam search; thereby performing stable image processing on the stereo images as well.

The invention enables image-retargeting that reduces the breakdown of the relationship between stereo images.

BRIEF DESCRIPTION OF THE DRAWINGS

The present invention will become fully understood from the detailed description given hereinafter and the accompanying drawings, wherein:

FIG. 1 is an example of image data subject to seam-carving;

FIG. 6 is an example of image data to be processed;

DESCRIPTION OF THE PREFERRED EMBODIMENTS

First, the outline of seam-carving will be described with reference to FIGS. 1 to 5. Embodiments of the present invention, which are predicated on the seam-carving, will be described later with reference to FIGS. 6 to 15.

FIG. 1 is a conceptual illustration for explaining seam-carving. The seam-carving refers to an image filtering technique for modifying the image content without changing picture elements that human beings interpret semantically. This technique searches for, in an image 100 of FIG. 1, connection paths such as seams 110 to 115 connecting the top and bottom of the image while avoiding observable image objects such as subjects in the image, and deletes or duplicates pixels along the seam. This technique focuses primarily on selecting as a seam a curve that avoids observable objects in the image by taking an area that minimizes image gradient energy expressed by the equation (1) while satisfying constraint conditions of (1) monotonicity and (2) continuity. This technique searches for a pixel relationship of a small color change between connection components, that is, a pixel of little energy, from top to bottom and from left to right.

$$E = \left|\frac{\partial I}{\partial x}\right| + \left|\frac{\partial I}{\partial y}\right| \quad (1)$$

The constraint conditions of (1) monotonicity and (2) continuity denote (1) a unique constraint condition that only one pixel to be processed exists when one seam and a y-coordinate value are selected and (2) a constraint condition that |x0−x1|<k needs to be satisfied to have connection components of (x0, y) and (x1, y+1).

Figure 4:
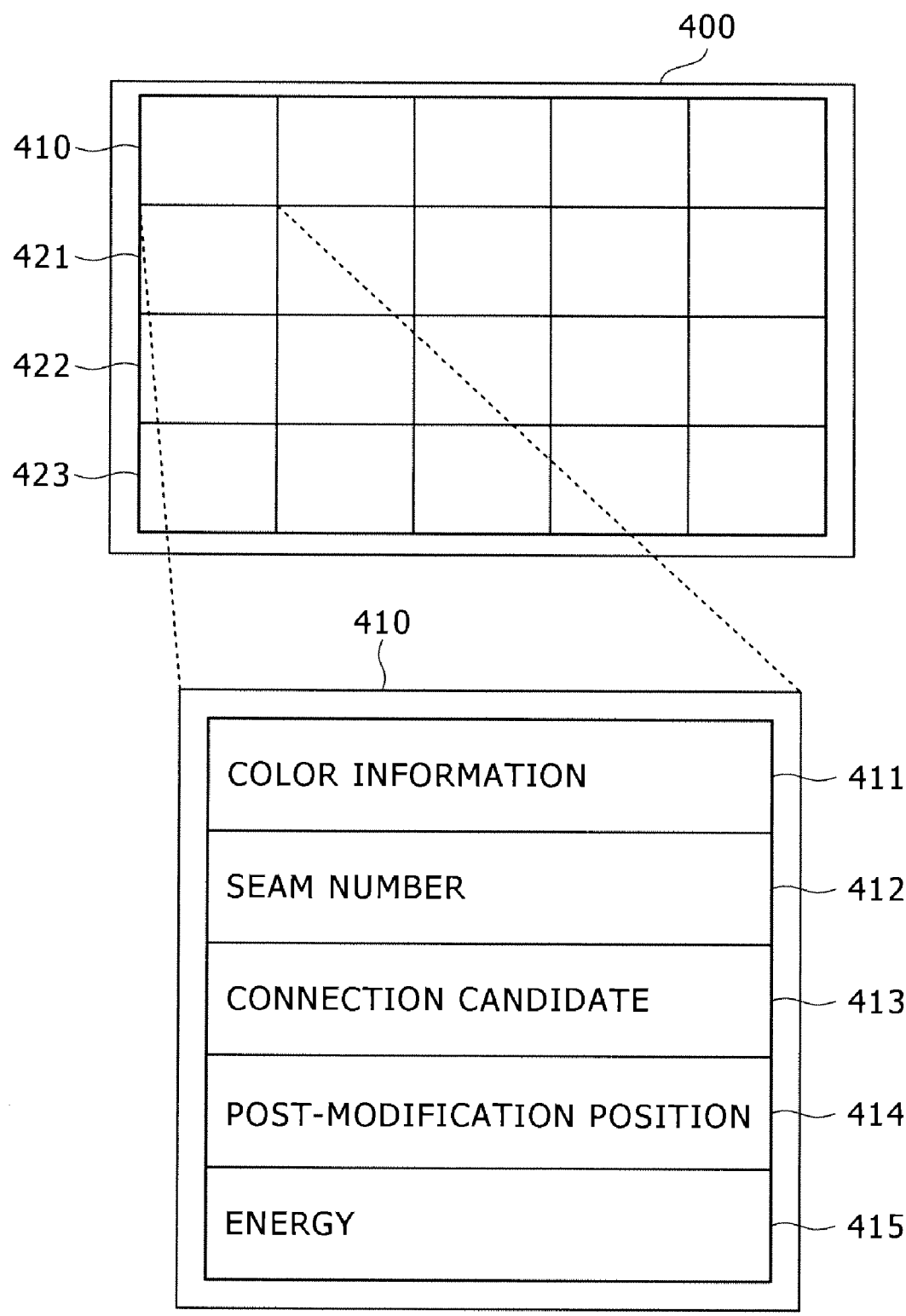
FIG. 4 is an example of a data structure for performing seam-carving.

FIG. 4 shows an example of data areas for calculating and storing such a seam. A two-dimensional array of the image size of X horizontal pixels by Y vertical pixels including a unit structure 410 as an element is used. The unit structure 410 is composed of a data area (411) for storing color information (R, G, B) components of an image, a data area (412) for storing a seam number, a data area (413) for storing calculation data indicating the direction of an upper connection candidate, a data area (414) for storing post-seam-deletion/modification image position information, and a data area (415) for storing image energy for determining the direction of a seam.

Figure 2:
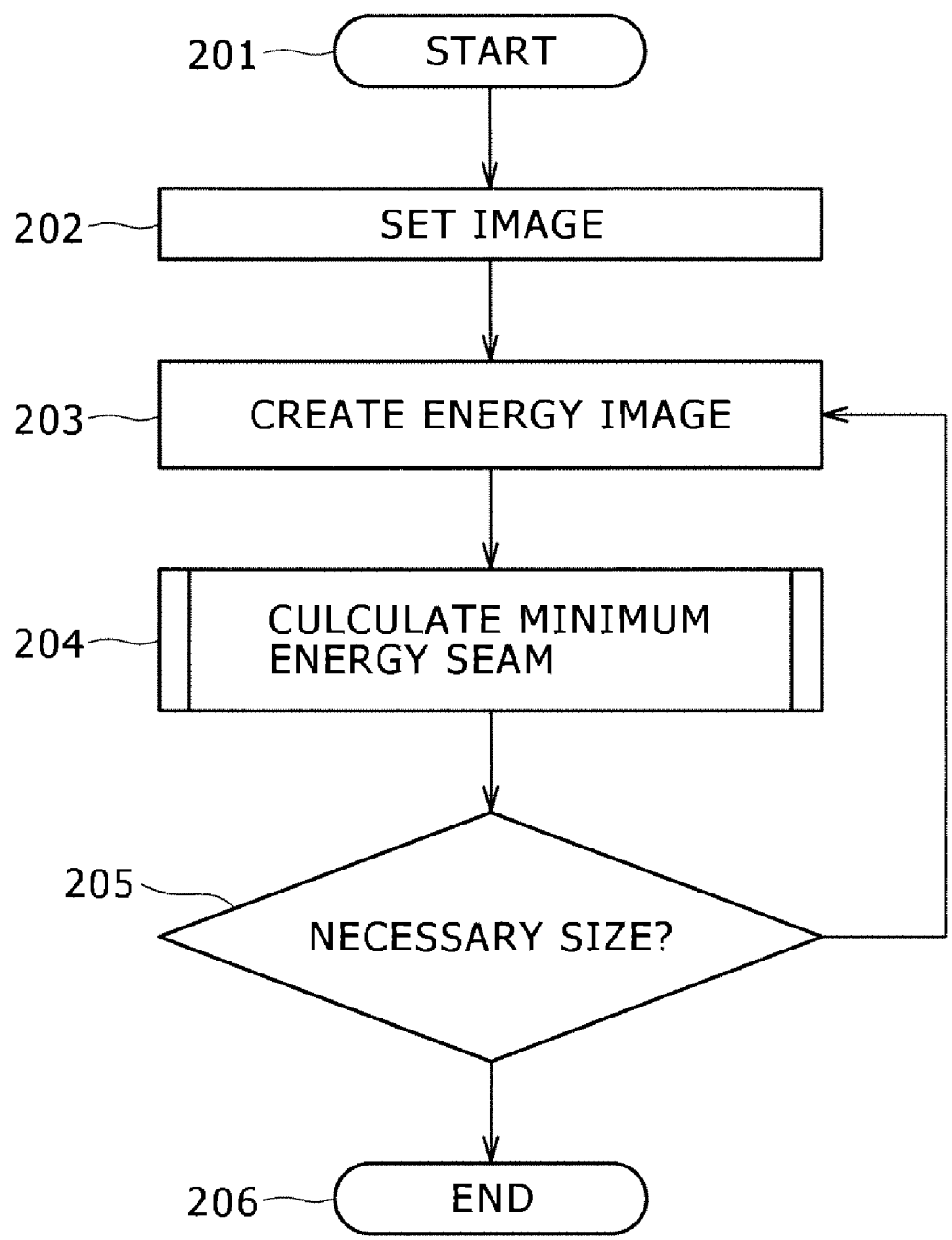
FIG. 2 is a general flowchart of seam-carving.
Figure 3:
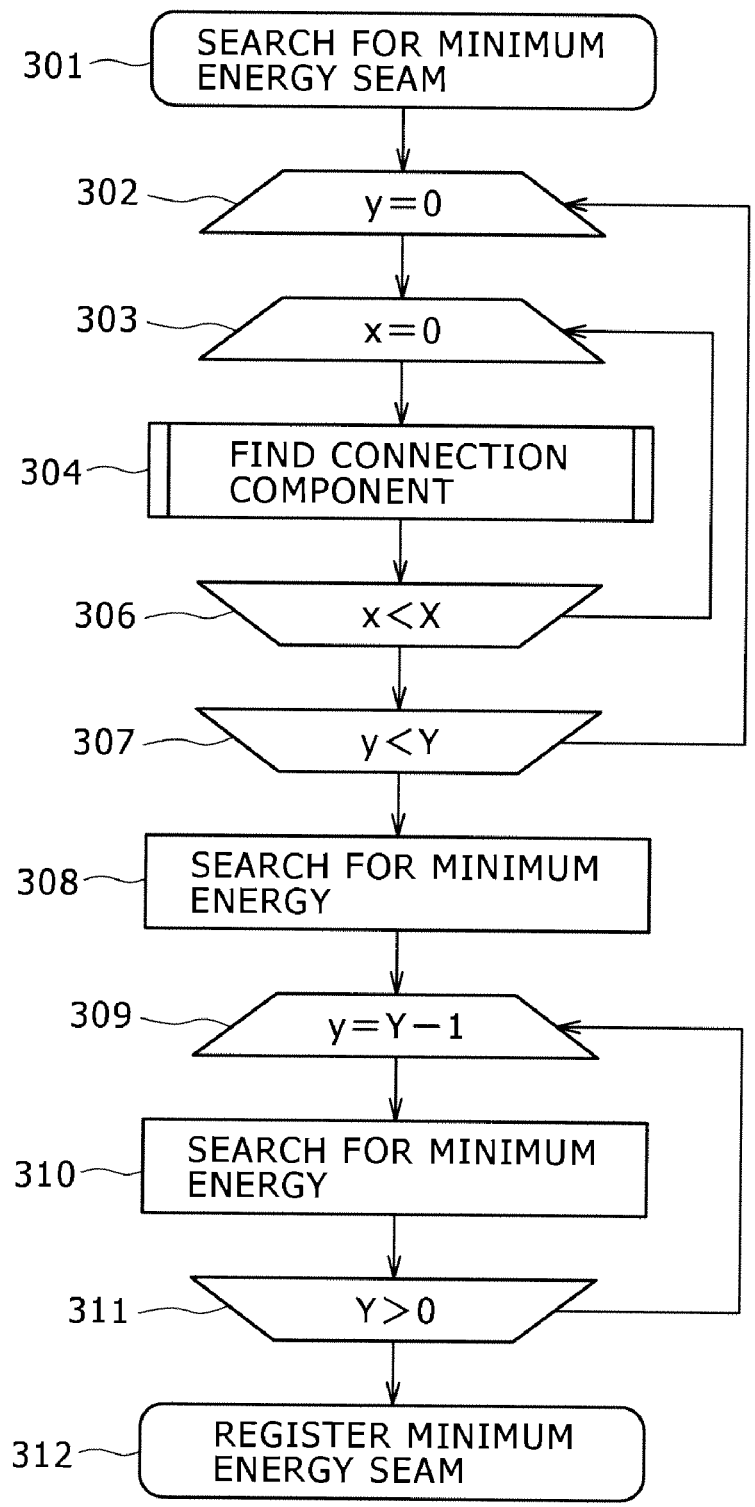
FIG. 3 is a flowchart of seam search processing of seam-carving.

In the existing seam-carving, seams for minimizing the energy of the equation (1) are searched for from top to bottom. FIG. 2 shows a flow of processing for implementing this technique.

First, in step 202, an original image P0 of X horizontal pixels by Y vertical pixels is prepared, and initialization is performed. For each pixel (coordinate position (x, y)), color information about the original image is copied to the color information area 411 of the unit structure positioned at (x, y), a default value "−1" is written into the seam number (412), "0" is written into the calculation data area D (413), the values (x, y) are written into the image position information F (414), and "0" is written into the energy E.

For the image structure 400, the loop of steps 203 to 205 is repeated N times so that a necessary number (N) of seams are selected in increasing order of energy. Steps 203 to 205 in FIG. 2 is the loop repeated N times for creating these seams. Hereinafter, the index of this loop is a seam number n.

In step 203, a temporary image PT for energy calculation is created. The temporary image PT is created by writing color information about each pixel of the seam number (412) "−1" among pixels (x, y) in the original image structure 400, i.e., that has not yet been determined to be a seam in the image into the pixel of the pixel coordinate position 414. The intensity I(x, y) of the pixel (x, y) of the image PT is calculated. Therefrom, the image gradient energy is calculated based on the equation (1).

After the calculation, the image gradient energy information calculated at the coordinates F in the image PT is written into the image energy area E (415) of each pixel of the seam number (412) "−1" among pixels (x, y) in the original image structure 400, i.e., that has not yet been determined to be a seam in the image.

In step 204, based on the information in the energy area E (415), a seam having the minimum energy is selected. The details of this processing are shown in a flowchart of FIG. 3.

Steps 302 and 307 respectively denote the start position and end determination of loop processing for repeating steps 303 to 306 between the y-coordinate=1 (i.e., the second row from the top) and y=Y−1 (i.e., the bottom row). Further, steps 303 and 306 denote loop processing for repeating step 304 between the x-coordinate=0 and x=X−1.

Step 304 denotes processing for selecting a connection component from the immediately upper row than a pixel position (x, y) indicated by the loop. The details of this processing are shown in a flowchart of FIG. 5.

Step 501 denotes the start of connection component search processing. In step 502, respective k pixels rightward and leftward from the pixel of position coordinates (x, y−1), that have not yet been determined to be a seam are selected. This is referred to as a set X0.

In step 503, a pixel (x0, y−1) that has the minimum value in the gradient energy area 415 is selected from among the set X0.

In step 504, the selected x0 value is stored in the connection component storage area D (413).

In step 505, the value of the image energy area E (415) of the upper connection pixel (x0, y−1) is added to the value of the image energy area E (415) of the pixel (x, y), thus overwriting and updating the image energy area E (415) of the pixel (x, y). That is, an energy value accumulated along a seam in the direction indicated by the connection component storage area 413 is stored in this area.

Thus, the connection component finding processing in step 304 is completed (step 506).

The loop processing of steps 302 to 307 is performed for y until the bottom row y=Y−1.

In step 308, in the bottom row, a structure that has the minimum accumulated energy in the image energy area E (415) is selected from among the structures in the (Y−1)th row. Steps 309 and 311 respectively denote the start and end determination of loop processing for performing step 310 while decrementing the y value from y=Y−1 to y=0 by one. In step 310, the current seam number n is written into the data area (412) for storing the seam number of a pixel positioned at (x, y). Further, x-coordinates in the data areas (414) for storing post-seam-deletion/modification image position information F, that are positioned on the right side of the seam, i.e., greater than x1 among pixels in the row of the same y-coordinate are decremented by one. Thereby, the coordinate values of a modified image in which pixels that have not yet been selected as a seam are left-aligned are obtained. Further, at the time of following the connection component in the upper row than the position, the immediately upper x-coordinate information is read from the connection component storage area 413 of (x, y) image information, and becomes a new x-coordinate position.

Step 311 of pixels denotes loop end determination, and step 310 is repeated while decrementing y by one until y becomes 0. By performing steps 309 to 311, the nth minimum energy seam information is registered in the structure 400.

The flow returns to FIG. 2. Step 205 denotes the end determination of the seam search. In step 205, the value of n is checked. If a necessary number of seams are selected, the loop processing is ended. If the number of seams is smaller than the necessary number N, n is incremented by one, and the flow returns to step 203.

The repetition of the processing creates an image of a new size in which horizontal N pixels have been deleted from the original image.

Each processing in the flowcharts is performed by a later-described central processing unit reading and executing programs.

The outline of seam-carving has been described. Hereinafter, specific embodiments will be described.

A first embodiment indicates a processing mechanism for implementing image information processing for modifying a pair of stereo images such as 601 and 602 in FIG. 6 to stereo images 621 and 622 having a modified horizontal size of X−N without modification to principal objects in the images and with little change in the parallax between the images. That is, this embodiment indicates image information processing for changing the images of X in width and Y in height to the images of X'=X−N in width and Y in height.

Figure 7:
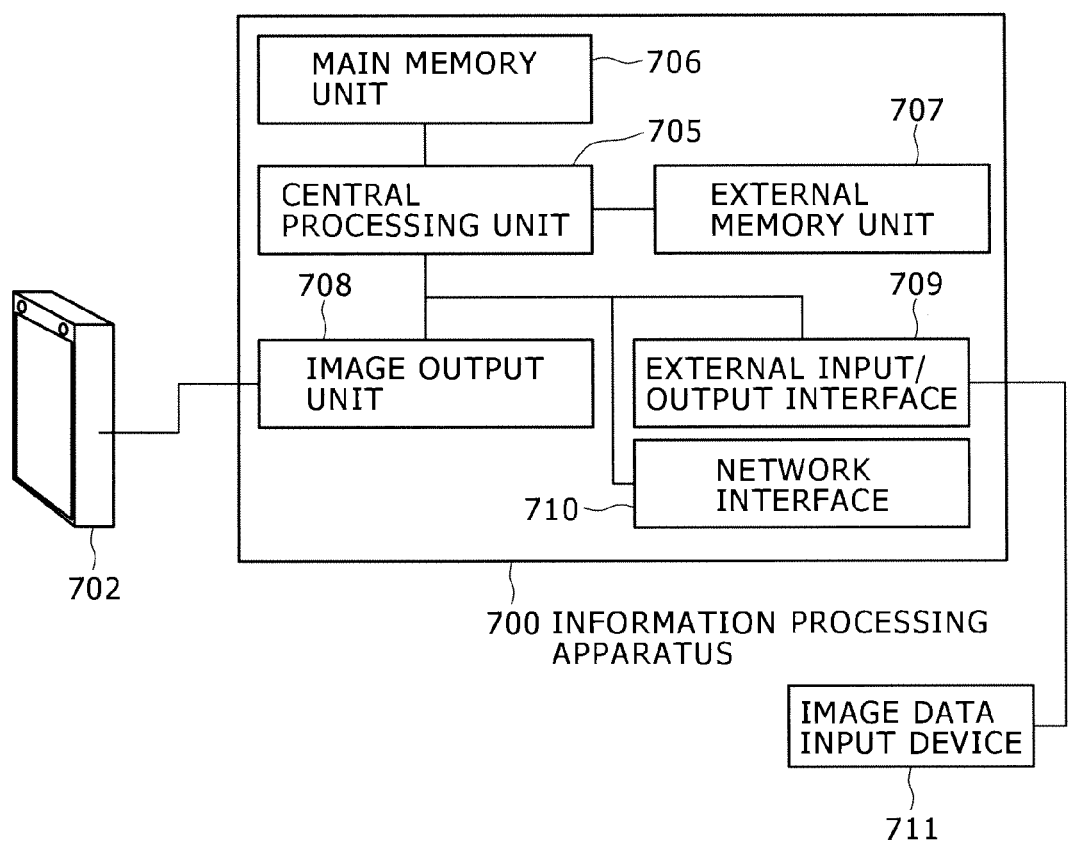
FIG. 7 is an example of a computer processing apparatus.

FIG. 7 is a schematic diagram showing an example of a mechanism for achieving a standard information processing apparatus 700 for performing such an information processing routine. The information processing apparatus 700 is composed of a central processing unit 705, a main memory unit 706, an external memory unit 707, an image output unit 708 for creating images to be displayed to the outside, an external input/output interface 709, and a network interface 710.

These information processing devices are implemented such as devices in a general-purpose computer. Further, a general-purpose external-device control interface such as USB is used as the external input/output interface. Further, the information processing devices exchange messages with one another through the network interface 710, in which a message exchange protocol such as TCP/IP is used for network implementation. Further, an image data input device 711 for inputting image data is connected. This readout device 711 can be implemented using a technique of a reader of magneto-optical data such as an SD card.

Figure 8:
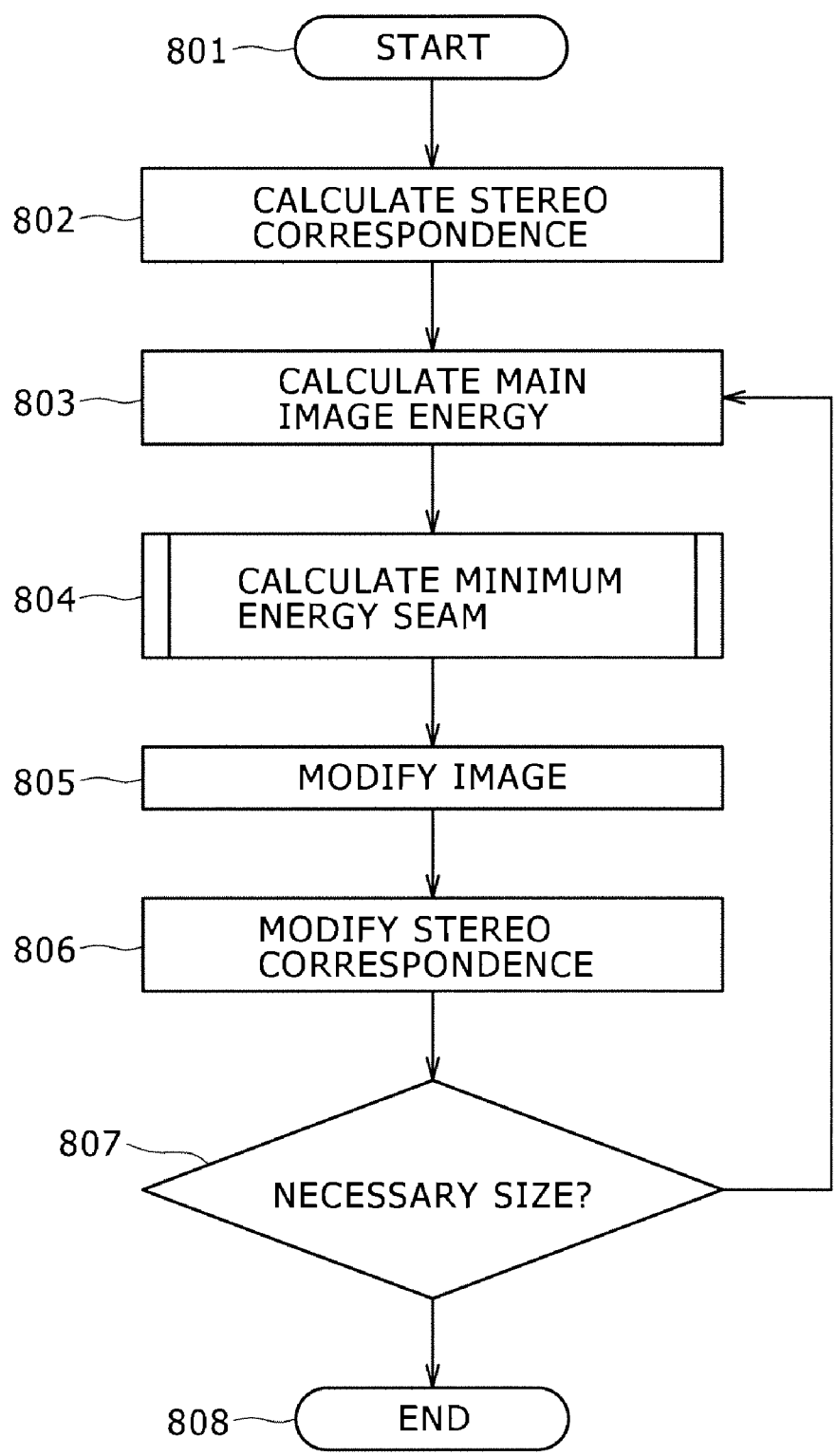
FIG. 8 is a general flowchart.

FIG. 8 is a flowchart of information processing for achieving this embodiment.

In step 801 in FIG. 8, stereo pair images P0 and P1 (e.g., 601 and 602 in FIG. 6) of X horizontal pixels by Y vertical pixels are read from the image data input device 711. In the images P0 and P1, P0 denotes a main image, and P1 denotes a sub image shot from a camera position therearound. These are digital images shot by two cameras having the same viewing angle and the same direction with a fixed parallax.

Figure 9:
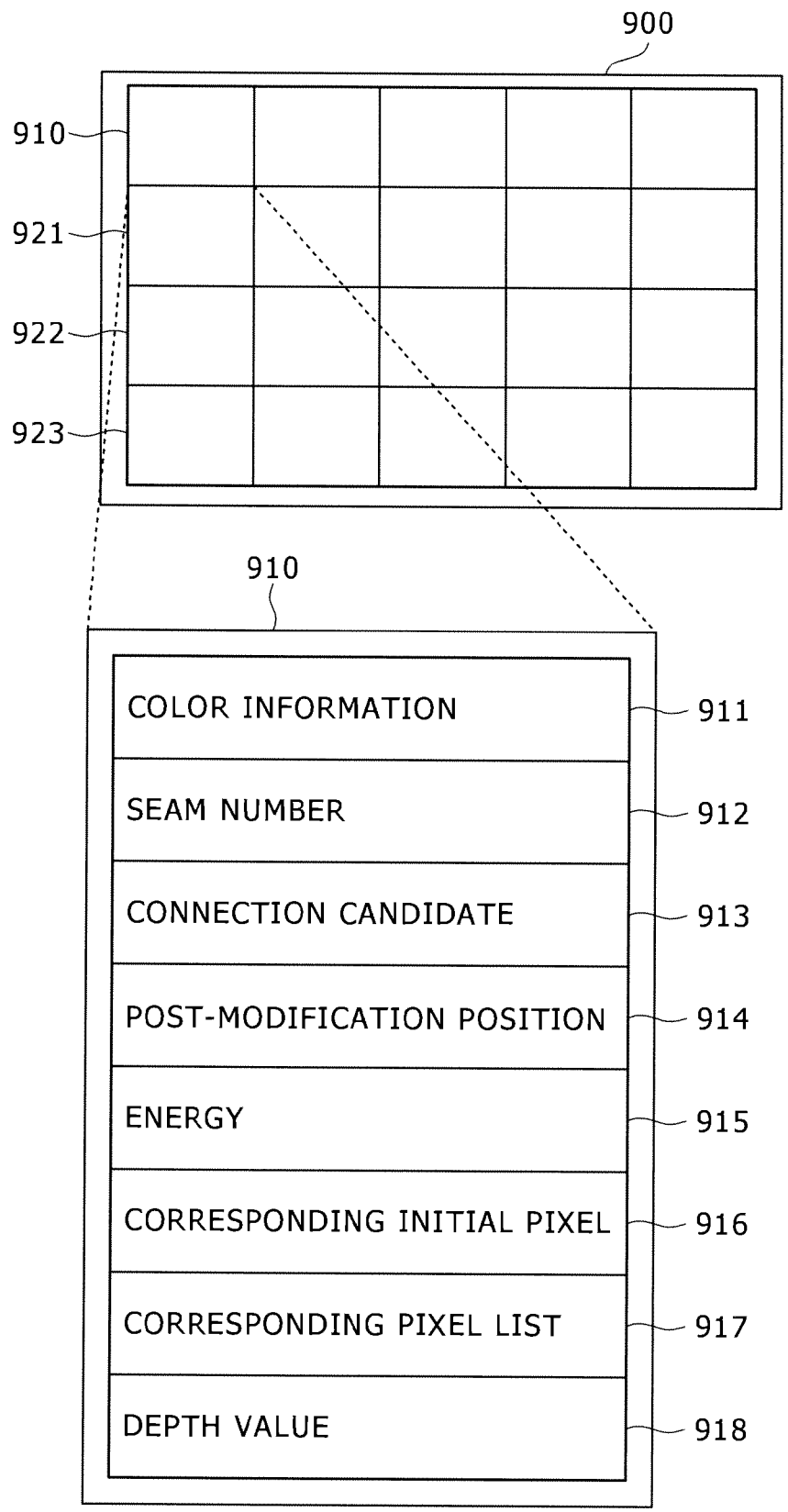
FIG. 9 is an example of a structure for storing data corresponding to each pixel in a main image to be processed.

FIG. 9 shows data areas for calculating and storing a seam of the main image P0. A data structure of a two-dimensional array of the image size of X horizontal pixels by Y vertical pixels including as an element a unit structure 910 for storing information necessary for calculation process, corresponding to one pixel in P0 is prepared and used in the process of this calculation. The unit structure 910 is composed of a data area (911) for storing color information (R, G, B) components of an image; a data area (912) for storing a seam number; a data area (913) for storing calculation data indicating the direction of an upper connection candidate; a data area (914) for storing post-seam-deletion/modification image position information; a data area (915) for storing image energy for determining the direction of a seam; an image coordinate position 916, in the image P1, corresponding to the pixel; a pixel list 917, in the image P1, corresponding to the pixel; and depth information 918 on the analogy of the stereo.

Figure 10:
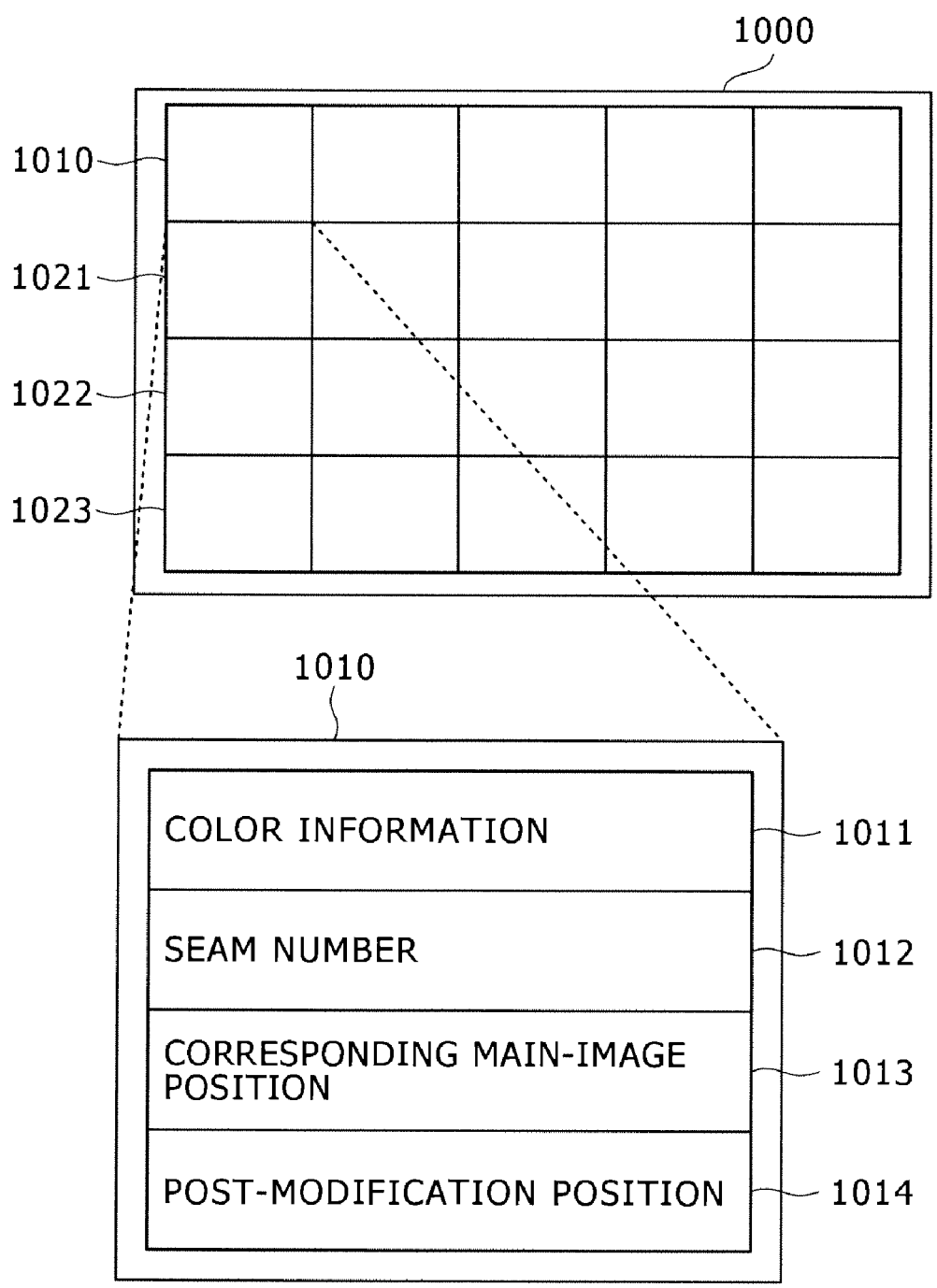
FIG. 10 is an example of a structure for storing data corresponding to each pixel in a sub image to be processed.

FIG. 10 shows data areas for calculating and storing a seam of the sub image P1. A two-dimensional array of the image size of X horizontal pixels by Y vertical pixels including a unit structure 1010 as an element is used. The unit structure 1010 is composed of a data area (1011) for storing color information (R, G, B) components of a pixel of P1, a data area (1012) for storing a seam number, a data area (1013) for storing a corresponding P0 pixel position, and a data area (1014) for storing post-seam-deletion/modification image position information.

In step 801, initialization is performed on the main image P0. For each pixel at a coordinate position (x, y), color information is copied to the color information area 911 of the unit structure, "−1" is written into the seam number (912), "0" is written into the calculation data area (913), the values (x, y) are written into the image position information (914), and "0" is written into the energy (915). Also, initialization is performed on the sub image P1, "−1" is written into the seam number, and "0" is written into the others.

In step 802, a table indicating the correspondence relationship between the stereo images is created. In this step, the correspondence pixel relationship between the stereo pair is detected with sub-pixel accuracy. In this embodiment, this is performed by the phase-only correlation method. The details thereof are described in "A High-Accuracy Sub-Pixel Correspondence Technique Using 1D Phase-Only Correlation" by Takuma SHIBAHARA, Norihito NUMA, Sei NAGASHIMA, Takafumi AOKI, Hiroshi NAKAJIMA, and Koji KOBAYASHI, The Transactions of the Institute of Electronics, Information and Communication Engineers D Vol. J91-D No. 9 pp. 2343-2356.

Each position $p1(x\_p, y\_p)$, in the P1 image, corresponding to each pixel $p0(x, y)$ in P0, created by the above processing is stored in the memory area 916 of each pixel structure in the main image. This is referred to as a corresponding initial pixel. Both x_p and y_p are decimals and coordinates indicating a position in the image with sub-pixel accuracy. Further, depth information obtained from these parallax values is stored in the memory area 917 of each pixel structure in the main image.

In the image structure 900, the loop of steps 803 to 806 is repeated N times so that a necessary number (N) of seams are selected in increasing order of energy. Step 807 in FIG. 8 denotes the end determination of this loop repeated N times. Hereinafter, the index of the loop is a seam number n.

In step 803, a temporary image P1 for energy calculation is created. The temporary image is created by writing color information about each pixel of the seam number (912) "−1" among pixels (x, y) in the original image structure 900, i.e., that has not yet been determined to be a seam in the image into the position of the coordinates F of the pixel position 914.

The intensity I(x, y) of the pixel (x, y) of the image P1 is calculated from R, G, and B. Therefrom, the image gradient energy is calculated based on the equation (1).

After the calculation, the image gradient energy information calculated at the coordinates F in the image P1 is written into the image energy area E (915) of each pixel of the seam number (912) "−1" among pixels p=(x, y) in the original image structure 900, i.e., that has not yet been determined to be a seam in the image.

In step 804, based on the energy information on the temporary image P1, a seam that minimizes the value obtained by adding the corresponding energy from the sub image to the energy of the main image is selected. The details of this processing are shown in a flowchart of FIG. 11.

Steps 1102 to 1108 denote loop processing for repeating steps 1103 to 1107 for y between the y-coordinate=1 (i.e., the second row from the top) and y=Y−1 (i.e., the bottom row).

Steps 1103 to 1107 denote loop processing for repeating steps 1104 to 1106 for x between the x-coordinates=0 and X−1.

Figure 5:
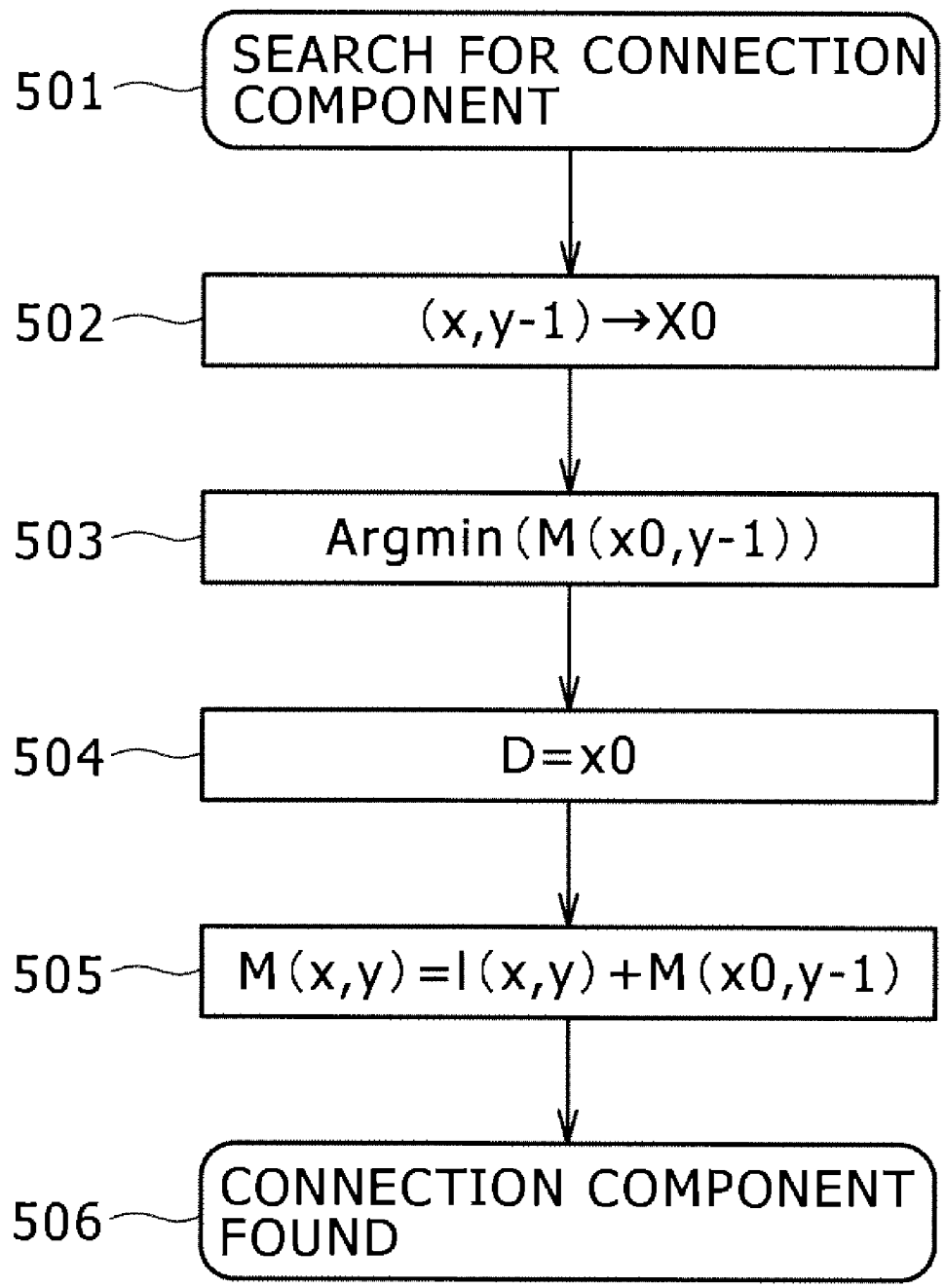
FIG. 5 is a flowchart of seam connection processing of seam-carving.

In step 1104, a pixel p_00 to be connected is searched for from one row of the image P0, using the energy function of the main image. This processing is performed based on step 304 and the detailed routine of FIG. 5 shown as a prior art. Step 1105 denotes processing for selecting a connection component from the upper row. The details of this processing are shown in FIG. 12.

Figure 12:
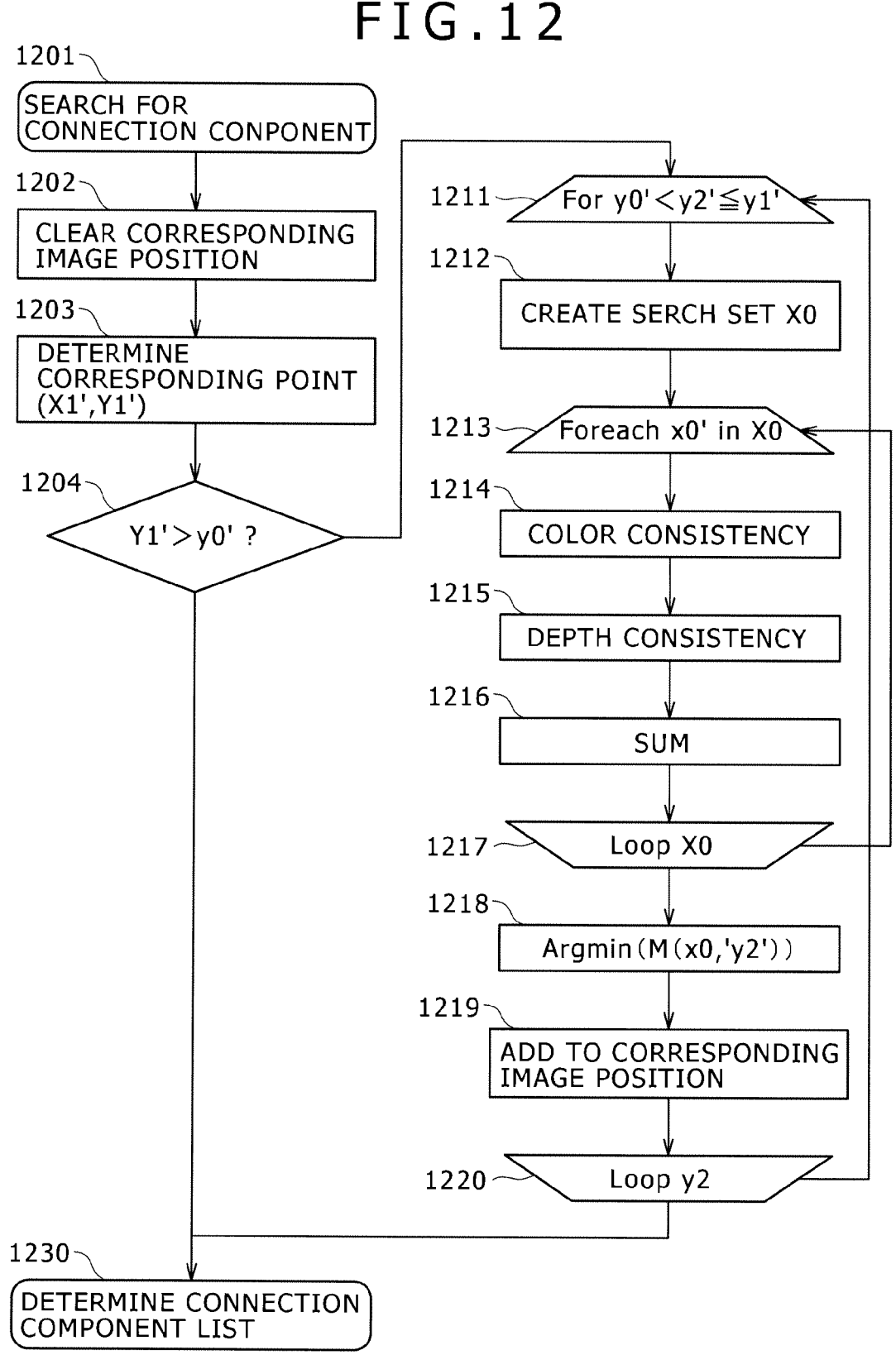
FIG. 12 is a flowchart of seam connection processing.
Figure 13:
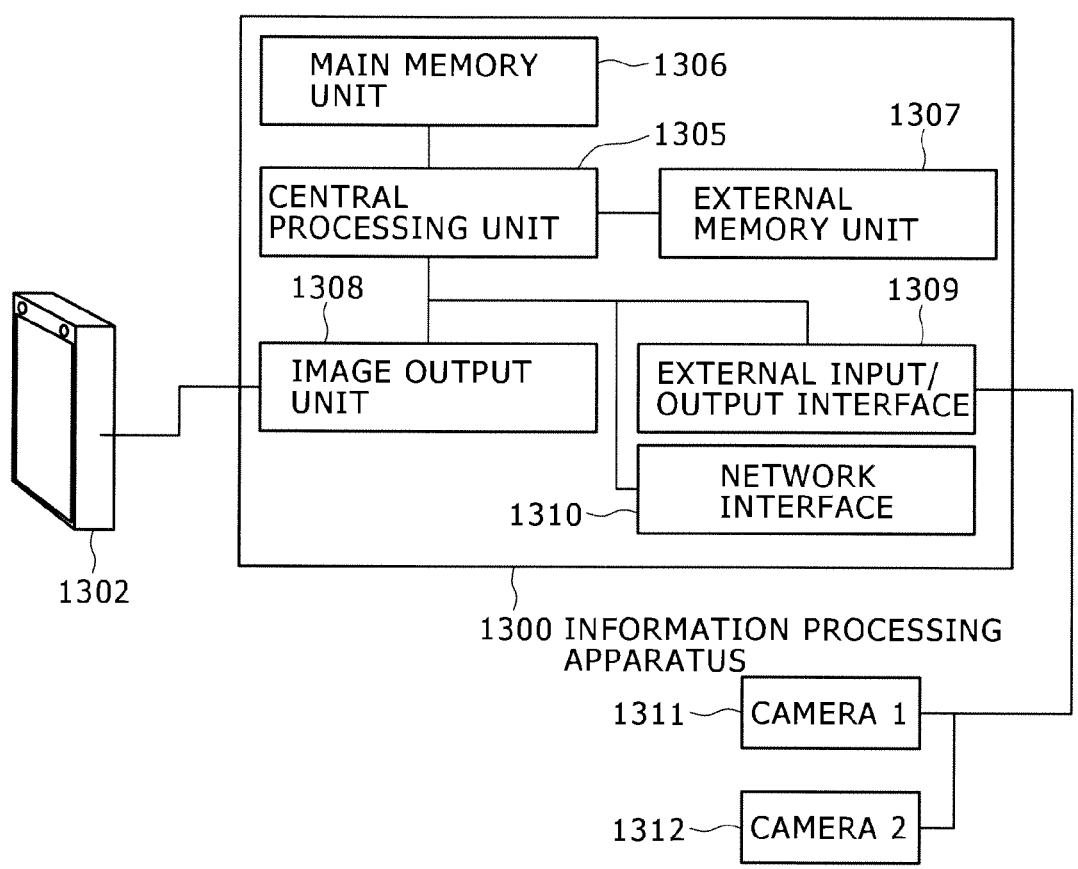
FIG. 13 is an example of a computer processing apparatus according to a second embodiment.

FIG. 12 shows processing for selecting a pixel p1, in the sub image P1, corresponding to a pixel p0 which is a seam candidate in the main image P0. The pixel position denotes zero or more lists in a coordinate system indicated by integers. Elements in the list are coordinates indicating specific pixels in the image P1. This is referred to as a corresponding pixel list (917). Step 1201 is processing for starting a series of processing routines for retrieving an appropriate pixel in the proximity of the corresponding initial pixel p1=(x_p, y_p) and storing it in the corresponding pixel list.

In step 1202, the value of a corresponding image position 2 is cleared for an empty list.

In step 1203, the corresponding initial pixel p1(x_p, y_p) written in the memory area 916 of the structure of the pixel p0 in step 802 is read, and y_p is rounded off to the nearest integer value y1'=round(y_p).

Then, the value of the corresponding pixel list (917) of the connection component pixel p_00 of the seam in the image 0 is read. Assume that the y value thereof is expressed as y0'.

If y0'>=y1', no pixel is registered in the list (i.e., the empty set), and the flow proceeds to step 1230. If y1'>y0', the loop processing of steps 1211 to 1220 is performed.

Figure 14:
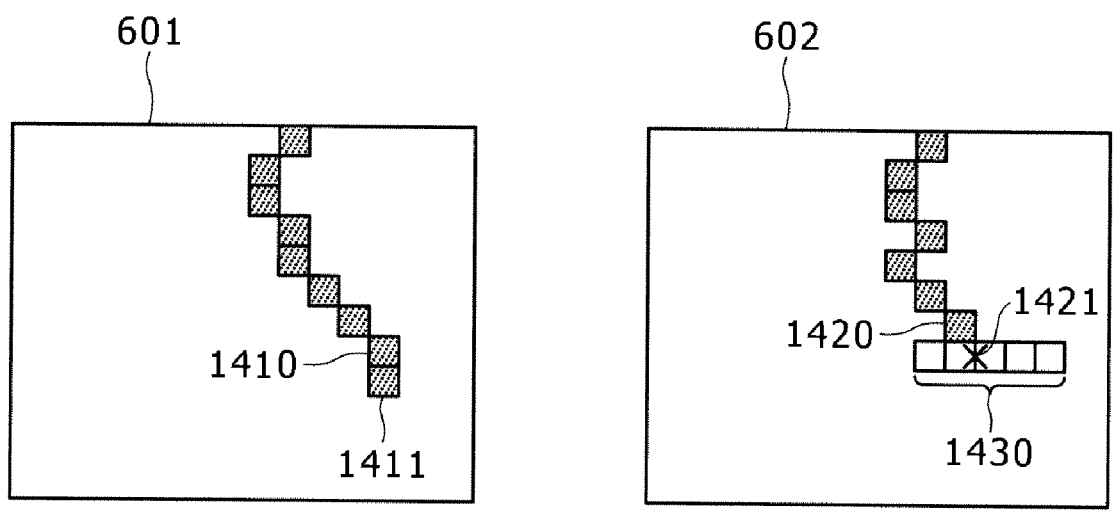
FIG. 14 is an example of pixel search according to a first embodiment.

Step 1211 denotes the start of loop processing for repeating a variable value yy indicating a row in the image P1 between y0' and y1', and the processing of steps 1212 to 1219 is performed for each row y=yy in the sub image P1. In step 1212, a temporary variable D_all_total is set to 0, and a pixel set X0 within the proximity of the corresponding image position p0' (distance 2*kk*) is created in the row y=y1' in the sub image P1. FIG. 14 is a schematic diagram showing the set X0. Numeral 1410 denotes a connection pixel p_00 in the immediately upper row in the image P0, 1411 denotes a pixel p, 1420 denotes an element pixel (at the bottom) in the corresponding pixel list of p_00, 1421 denotes a coordinate position indicated by the corresponding initial pixel 916 of the pixel p, and 1430 denotes the pixel set X0 selected from the row y=yy.

Step 1213 denotes the start of loop processing for repeating the variable value yy indicating a row in the image P1 between y0' and y1', and the processing of steps 1214 to 1216 is performed for each element pixel p1'=(x1', y1') in the set. First, in step 1214, color consistency is added to the energy function. Processing for comparing color information p0.color about the pixel p0 and color information p1.color about the pixel p1 is performed, and the result is stored in a variable D_c=colDiff(p0, p1).

In this processing, the color information 911 about the pixel p0 in the image P0 and the color information 1011 about the pixel p1 in the image P1 are compared, and the result is calculated as a distance. There are known some techniques for defining a distance between two colors, and it is possible to adopt an appropriate one in accordance with the definition of color space; however, this embodiment simply provides an RGB color information difference |r0−r1|+|g0−g1|+|b0−b1| (where (r0, g0, b0) (r1, g1, b1) are RGB values respectively). This value is stored in a temporary variable as D_c.

Then, in step 1215, the consistency of depth and estimated distance information is added to the energy function.

The difference between depth information about the sub image P1 and depth information about candidate pixel p1 is calculated, thereby obtaining the calculated result D_z=|p0.depth−p1.depth|. Further, the distance on the x-y plane between p1' and p0' is calculated as D_xy=((x_p−x1')^2+(y_p−y1')^2)^(½). The value of Dz+D_xy is stored in a temporary variable D_d. In step 1216, the above two elements are summed so that a final evaluation value is calculated as D_all=A_c D_c+A_d D_d (where A_c and A_d are constants in this embodiment), and the evaluation value is stored in the temporary area. It is checked whether values D_all have been created for all search set points x0. If there is a point that has not yet been processed, the loop processing of steps 1214 to 1216 is repeated.

In step 1218, an x0' value that minimizes D_all is selected from among the x0' values. This value becomes coordinates (x0', yy) of the seam in the row y=y2 in the image P1.

In step 1219, the following information is updated. The selected coordinate values (x0', y2) in P1 are additionally stored, as information about the seam in the sub image, in the corresponding pixel list (917) of the structure of the pixel p0. Further, it is modified to D_all_total=max(D_all_total, D_all).

In step 1220, the end-of-loop condition is checked. If y2' is less than y1', the loop processing from step 1211 is repeated. If y2' is equal to y1', the loop ends. If the loop ends, D_all_total is additionally stored in the gradient energy 915. Further, the depth value of the pixel p1 in the sub image and the depth value of the pixel p0 in the main image are averaged, and the depth value 918 of the pixel p0 in the main image is overwritten by the averaged value.

Thus, pixel selection processing in the corresponding sub image ends. A list finally stored in the corresponding pixel list is seam information, in the image P1, corresponding to the pixel p0 in the image P0. Further, the loop processing of steps 1102 to 1108 for the accumulated energy 915 is performed until the bottom row y=Y−1.

Figure 11:
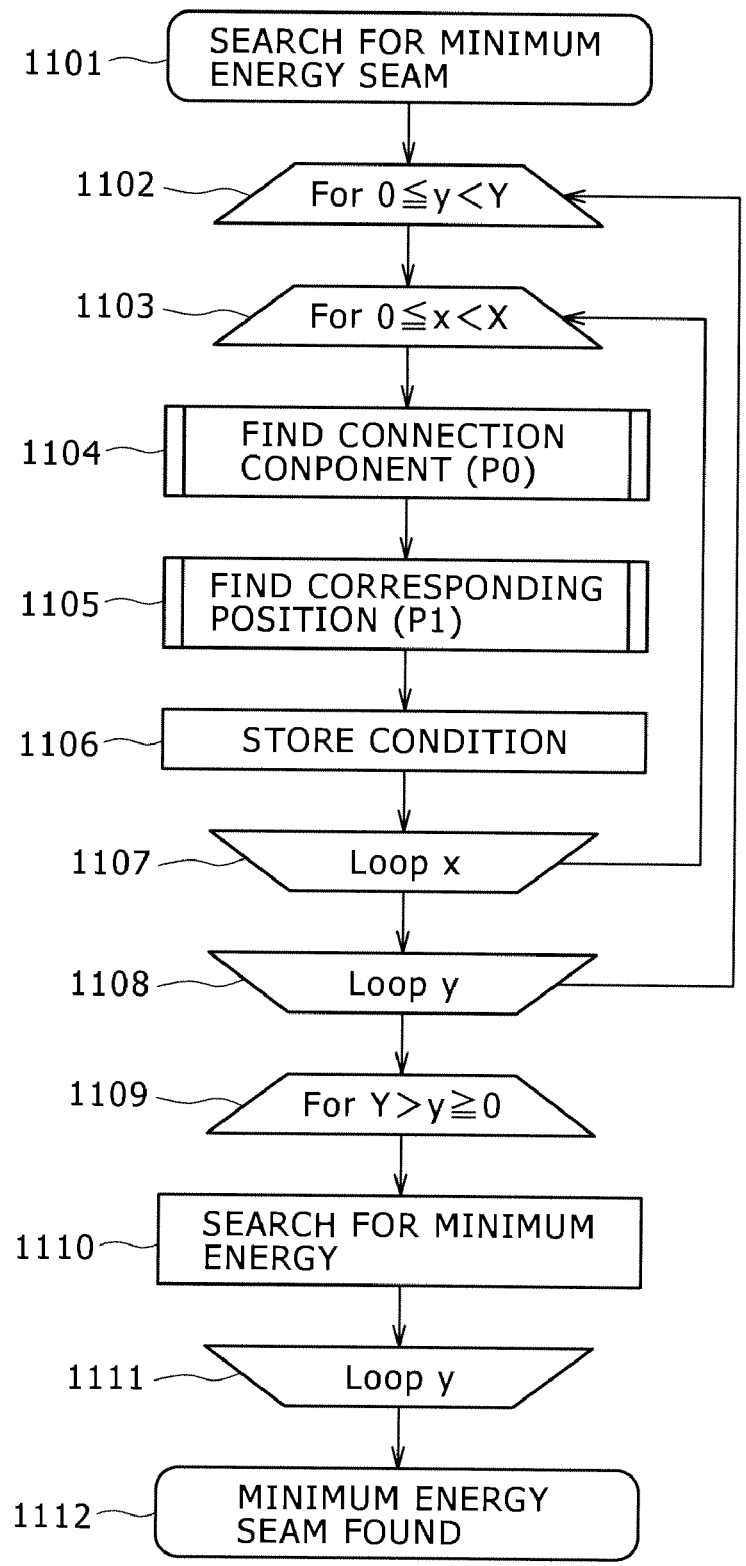
FIG. 11 is a flowchart of seam search processing.

The flow returns to the routine of FIG. 11, and the result obtained by summing the accumulated energy from the upper row, the energy of this pixel, and the corresponding sub-image energy D_all is stored, as the accumulated energy of the pixel, in the area 915 of the pixel p0(x, y) in the main image.

In steps 1109 to 1112, the same processing as steps 309 to 312 is performed.

As described above, in this embodiment, a path of the minimum pixel gradient energy is selected from among paths of pixels successively connected from top to bottom of a main image, the main image and a sub image constituting a pair of stereo images; each pixel position in the sub image corresponding to each pixel in connected pixels in the main image is calculated as an initial search point, from the stereo correspondence relationship between the main image and the sub image to be processed; a path of connected pixels in the sub image that minimizes energy obtained by summing color differences and position differences between pixels of the main image and pixels of the sub image is selected in the proximity of the initial search point; recursive search processing for optimal connected pixels is performed using energy generated by the difference between the main image and the sub image as a correction factor of the pixel gradient energy of the main image; a path of connected pixels that has the minimum energy is calculated from the overall value; and the composition and the horizontal and vertical size of the image are changed by inserting or deleting pixels along the path of connected pixels.

According to the method of this embodiment, a seam that has a small color difference between the main image and the sub image and a small discontinuous change in the depth value can be advantageously selected on a priority basis. Since the images are enlarged or reduced with pixels in these seams, the shapes of objects in the images are maintained, while the occlusion areas of the images are not modified. Therefore, the image retargeting of stereo images can be performed without breaking the correspondence relationship of stereo matching.

A second embodiment will be described. This embodiment indicates a device equipped with stereo cameras, that is, an example of a device for processing information acquired by the cameras. This embodiment is the same in configuration and processing as the first embodiment except for contents described below.

Mechanism elements 1301 to 1310 correspond to mechanism elements 701 to 710 in the first embodiment respectively, and two cameras 1311 and 1312 are added thereto. The two cameras are operated by the information processing apparatus. Shot image data is captured in the main memory through the input/output interface IF 1309, and stored in memory areas of a main image 701 and sub image 702.

The main image captured by the camera 1 and the sub image captured by the camera 2 are processed in the same way as in the first embodiment, which enables image retargeting using the technique of the first embodiment.

A third embodiment will be described. This embodiment is applied to multi-view L stereo images. This embodiment is the same in configuration and processing as the first embodiment except for contents described below.

Figure 15:
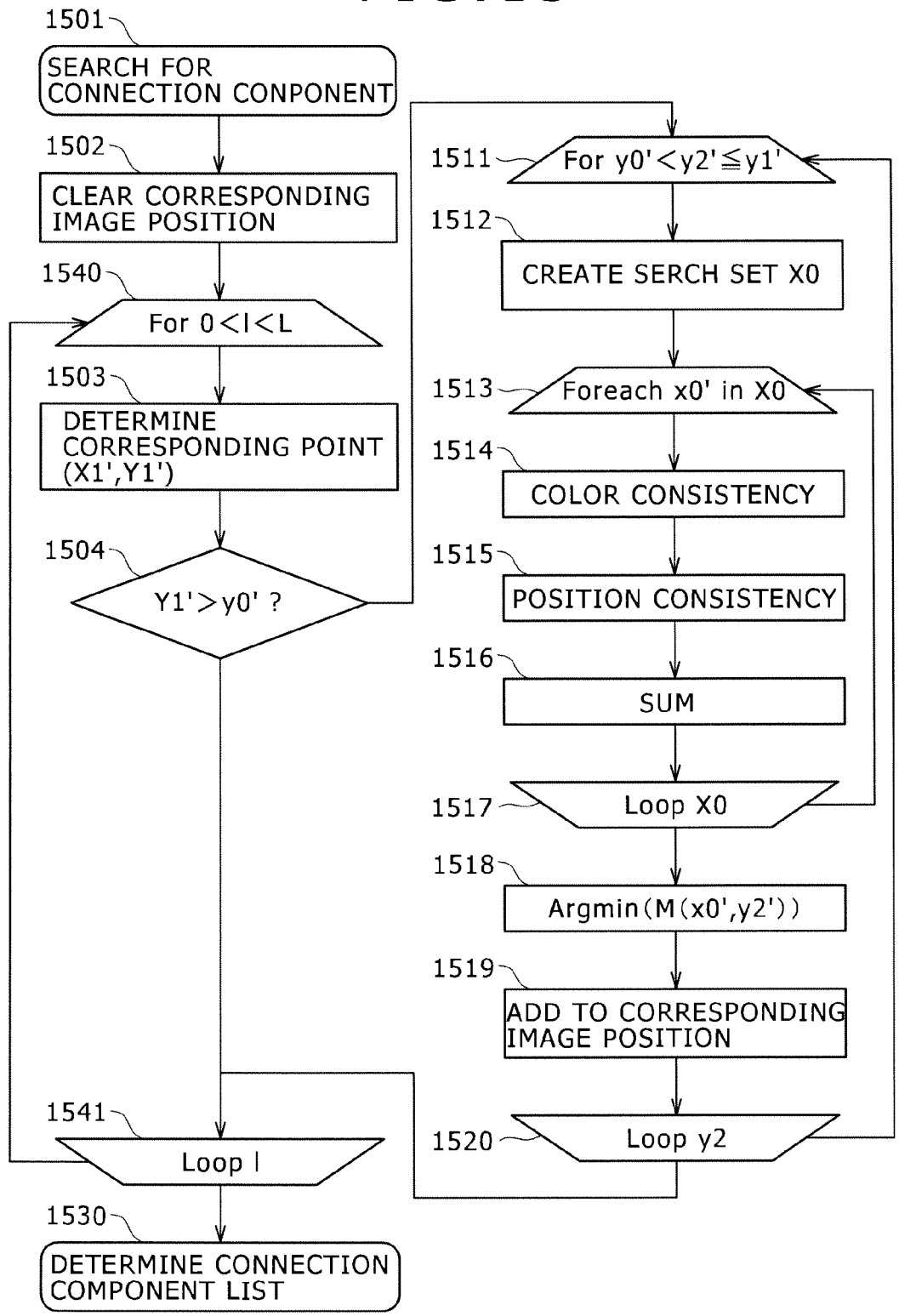
FIG. 15 is a flowchart of seam connection processing according to a third embodiment.

In this embodiment, L sub images are used as well as a main image 0. FIG. 15 is a flowchart showing a flow of processing according to this embodiment.

In this embodiment, L corresponding pixel lists are arranged and retained. In step 1502, an arrangement of corresponding pixel lists are all cleared. A variable 1 for specifying a sub image to be processed is changed from 1 to L−1 in the loop. The existence of steps 1540 and 1541 of the loop structure is a difference between the first embodiment and this embodiment.

Steps 1503 to 1520 performed between steps 1540 and 1541 correspond to steps 1203 to 1220 in the first embodiment respectively, so that the same processing is performed, only except for L repetitive additions of gradient energy in step 1520 and the average value of N depth values.

A fourth embodiment will be described. This embodiment shows an algorithm example of processing for adding significance around an edge to seam selection determination in the first embodiment in consideration of the bias of distance estimation specific to the phase-only correlation method. This embodiment is the same in configuration and processing as the first embodiment except for contents described below.

Instead of constant processing in the first embodiment, a variable defined by the following technique in accordance with the position (x, y) of the sub image is used as the A_d value, used in step 1206 in the first embodiment, for passing the spatial distance deviation between the stereo pair to the energy function.

$$A\_d(x,y)=A\_d1/(dd(x,y)+1)$$

where (dd(x, y) denotes the distance to the nearest edge detection position from the target pixel position (x, y) in P1' obtained by performing edge detection filtering on the image P1, and A_d1 is a constant.

By weighing based on the distance from the edge instead of the fixed value A_d in the process of calculation according to the first embodiment, only the color difference is used as an important criterion for calculation if the target pixel does not exist around the edge of the object, and the depth and position of the image are used with accuracy for calculation only if the pixel exists around the edge. This relieves the seam selection criterion from being affected by the phenomenon of variation of depth estimation in a flat object specific to the phase-only correlation method.

Each processing in the above-described embodiments is performed by the above-described central processing unit reading and executing programs.

As described above, by using image processing in the above-described embodiments, a point of existence of an image corresponding to a stereo image is preferentially detected in a seam search; therefore, by deleting or adding pixels in these seams, image retargeting can be performed on objects noticeable to human visibility without breaking the mutual stereo relationship.

What is claimed is:

1. An image processing apparatus wherein
a path of minimum pixel gradient energy is selected from among paths of pixels successively connected from top to bottom of a main image, the main image and a sub image constituting a pair of stereo images,
each pixel position in the sub image corresponding to each pixel in connected pixels in the main image is calculated as an initial search point, from a stereo correspondence relationship between the main image and the sub image to be processed,
a path of connected pixels in the sub image that minimizes energy obtained by summing color differences and position differences between pixels of the main image and pixels of the sub image is selected in the proximity of the initial search point,
recursive search processing for optimal connected pixels is performed using energy generated by the difference between the main image and the sub image as a correction factor of pixel gradient energy of the main image,
a path of connected pixels that has minimum energy is calculated from an overall value, and
the composition and the horizontal and vertical size of the image are changed by inserting or deleting pixels along the path of connected pixels.

2. An image processing method comprising the steps of:
selecting a path of minimum pixel gradient energy from among paths of pixels successively connected from top to bottom of a main image, the main image and a sub image constituting a pair of stereo images;
calculating each pixel position in the sub image corresponding to each pixel in connected pixels in the main image as an initial search point, from a stereo correspondence relationship between the main image and the sub image to be processed;
selecting a path of connected pixels in the sub image that minimizes energy obtained by summing color differences and position differences between pixels of the main image and pixels of the sub image in the proximity of the initial search point;
performing recursive search processing for optimal connected pixels using energy generated by the difference between the main image and the sub image as a correction factor of pixel gradient energy of the main image;
calculating a path of connected pixels that has minimum energy from an overall value; and
changing the composition and the horizontal and vertical size of the image by inserting or deleting pixels along the path of connected pixels.

3. An image processing method comprising the steps of:
selecting a path of minimum pixel gradient energy from among paths of pixels successively connected from top to bottom of a main image, the main image and (N−1) sub images constituting N sets of multi-view stereo images;
calculating each pixel position in the sub images corresponding to each pixel in connected pixels in the main image as an initial search point respectively, from each stereo correspondence relationship between the main image and the sub images to be processed;
selecting a path of connected pixels in the sub images that minimize energy obtained by summing color differences and position differences between pixels of the main image and pixels of the sub images in the proximity of the initial search point;
performing recursive search processing for optimal connected pixels using the sum of energy generated by the difference between the main image and the sub images as a correction factor of pixel gradient energy of the main image;

calculating a path of connected pixels that has minimum energy from an overall value; and changing the composition and the horizontal and vertical size of the image by inserting or deleting pixels along the path of connected pixels.

4. An image processing apparatus comprising:

an input unit which inputs image data;

a central processing unit which performs image processing on the inputted image data; and an output unit which outputs the image-processed image data, wherein the input unit inputs first image data and second image data as a pair of stereo image data, and wherein the central processing unit: calculates a path of pixels successively connected from top to bottom of an image of the first image data, based on pixel gradient energy;

calculates each pixel in the second image data corresponding to each pixel in the connected pixels in the first image data as an initial search point, based on a stereo correspondence relationship between the first image data and the second image data;

calculates pixels as a path of connected pixels in the second image data, that minimize energy obtained from color and position differences between pixels of the first image data and pixels of the second image data in the proximity of the initial search point;

calculates a path of optimal connected pixels in the first image data, using the energy; and changes the composition and the size of the image of the first image data and the second image data by inserting or deleting pixels in the first image along the path of optimal connected pixels and inserting or deleting pixels in the second image along the path of connected pixels in the second image data.

5. An image processing method in an image processing apparatus including an input unit which inputs image data, a central processing unit which performs image processing on the inputted image data, and an output unit which outputs the image-processed image data, the image processing method comprising the steps of:

inputting by the input unit first image data and second image data as a pair of stereo image data;

calculating by the central processing unit a path of pixels successively connected from top to bottom of an image of the first image data, based on pixel gradient energy;

calculating by the central processing unit each pixel in the second image data corresponding to each pixel in the connected pixels in the first image data as an initial search point, based on a stereo correspondence relationship between the first image data and the second image data, calculating by the central processing unit, pixels as a path of connected pixels in the second image data, that minimize energy obtained from color and position differences between pixels of the first image data and pixels of the second image data in the proximity of the initial search point, calculating by the central processing unit a path of optimal connected pixels in the first image data, using the energy, and changing by the central processing unit the composition and the size of the image of the first image data and the second image data by inserting or deleting pixels in the first image along the path of optimal connected pixels and inserting or deleting pixels in the second image along the path of connected pixels in the second image data.

* * * * *